Dec. 30, 1969   G. HIRS   3,486,621
FILTRATION OF ORGANIC MATERIALS
Filed Jan. 12, 1967
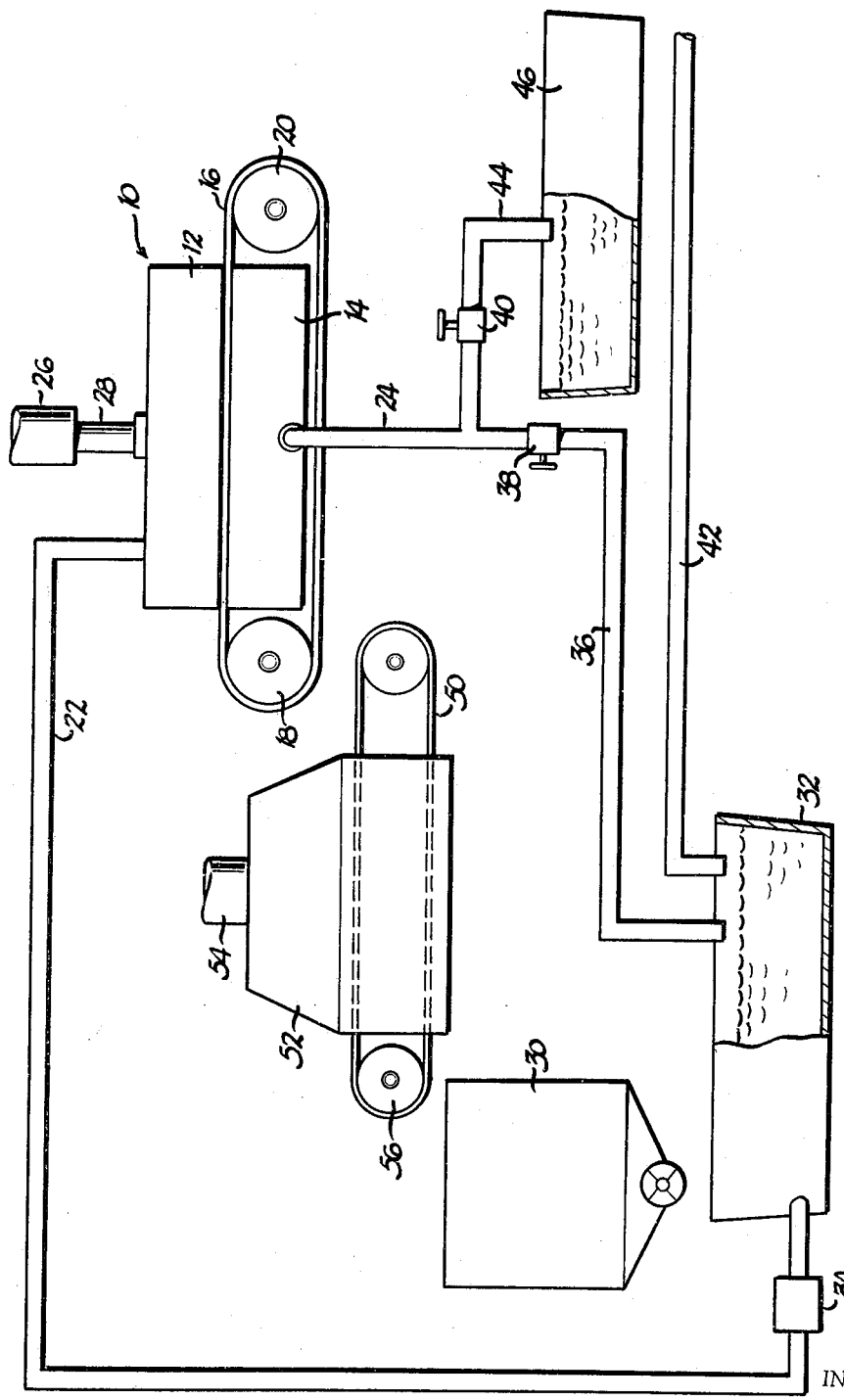
INVENTOR.
BY  GENE HIRS
WILSON, SETTLE, BATCHELDER
ATT'YS.   & CRAIG.

United States Patent Office

3,486,621
Patented Dec. 30, 1969

3,486,621
FILTRATION OF ORGANIC MATERIALS
Gene Hirs, Birmingham, Mich., assignor to Hydromation Engineering Company, Livonia, Mich.
Filed Jan. 12, 1967, Ser. No. 608,791
Int. Cl. B01d 37/02
U.S. Cl. 210—68                                        3 Claims

ABSTRACT OF THE DISCLOSURE

Pulp fibers are removed from white water by a combination of filtration and incineration. A filter medium support of a flat bed filter is precoated with an inert material to provide a bed for filtration. Inert material is also added to the white water to be filtered so that as filtration takes place by flow of white water through the filter medium, the inert material continuously presents new surfaces for filtration and keeps the bed porous. Upon eventual clogging of the filter medium, the medium is advanced from the filter to an incinerator where the organic material is burned off leaving the inert material intact. This inert material is fed back and reused in precoating the filter and providing body feed for the liquid to be filtered. Thus, the inert material is completely regenerated and reused in the process.

BACKGROUND OF THE INVENTION

This invention relates generally to methods of and apparatus for filtering organic materials.

There are many applications for filters in which an organic material has to be filtered from a liquid. One such application is in the removal of paper pulp from white water which is the effluent out of paper mills. Paper pulp is fibrous, and the fibers are very fine and are hair-like in form. It is very difficult to remove the pulp fibers from white water because when the pulp comes into contact with a two-dimensional surface, it immediately plugs the surface. In experiments made by applicant, a screen of about .001 to .002 inch mesh was required to catch the fibers, and the maximum flow rate before complete plugging was about 10 gallons per square foot. Under these conditions, it would require a filter of almost infinite area to be able to successfully filter the white water coming out of a paper mill. It is conceivable that a traveling screen of one or two mil mesh could remove this pulp material, but such a fine screen would be subject to too much wear and would not last very long. Consequently, it would be impractical.

It has been proposed to filter white water with a deep bed filter which contains a particulate filter medium, but two limitations appear to make this approach impractical: (1) It is difficult to backwash the fibers and do a thorough enough job, and (2) after backwashing, the fibers are still mixed in an aqueous solution, and the fibers still have to be removed in some manner.

SUMMARY OF THE INVENTION

It is now proposed to remove the pulp fibers from white water by a combination of filtration and incineration as follows. The filter medium support of a flat bed filter is precoated with an inert particulate material such as coke, mill scale, sand or some other inert material to build up a cake or bed on which filtration can be started. The contaminated liquid, which contains paper pulp, is then pumped into the filter along with a required amount of inert material to keep the cake continuously porous and keep it from plugging. The inert material continuously presents new surfaces for filtration and so tends to give the filter infinite area.

When the filter medium eventually becomes unduly clogged, filtration is terminated and the filter is emptied as by blowing it down. The filter medium, including the porous support and the cake, is advanced out of the filter, and the cake is transferred to a conveyor which feeds it into an incinerator. In the incinerator, the organic material is burned and is entirely consumed since it goes out the stack as smoke. The inert material, on the other hand, does not oxidize and remains intact. From the incinerator, the inert material is fed back to some sort of feeding device so that it can be reused in the process; that is, it can be used again in precoating the porous support of the filter and/or it can be added to the liquid to be filtered to provide body feed. In this manner, there is complete regeneration and reuse of the inert material and a complete disposal of the contaminants which in this case are cellulose pulp fibers.

The same process can be applied to the removal from a liquid of any organic material that can be oxidized at a temperature lower than that at which the inert material is oxidized or otherwise altered. For example, the process might be adapted to the disposal of sewage which again is primaritly organic material that can be oxidized while leaving the inert material such as coke, mill scale or sand intact.

Accordingly, it is an object of the present invention to provide a method and apparatus for removing organic materials, particularly paper pulp, from a liquid.

Another object of the invention is to remove paper pulp from white water by filtration using a body feed to maintain the porosity of a filter cake.

Another object of the invention is to incinerate the filter cake resulting from filtration of white water to which inert material is added as a body feed.

A further object of the invention is to completely dispose of organic material and preserve inert material of a filter cake which is incinerated after filtration.

Another object of the invention is to recycle inert material used as body feed in a filtration process so that the inert material is completely reused.

Other objects of this invention will appear in the following description and appended claims, reference being had to the accompanying drawings forming a part of this specification wherein like reference characters designate corresponding parts in the several views.

ON THE DRAWINGS

The single figure is a schematic diagram of a filtration and incineration system by which the method of the invention may be carried out.

Before explaining the present invention in detail, it is to be understood that the invention is not limited in its applicaton to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The filter 10 may be of the flat bed type in which there is an upper shell 12 and a lower shell 14 with a porous support 16 having a run located between the shells. The porous support 16 loops around two rolls 18 and 20 so that the portion of the support between the shells can be advanced out from the filter and a fresh portion of the support 16 will move into the filter for the next filtration cycle. The liquid to be filtered is fed into the upper shell 12 through a line 22, and the effluent liquid leaves the lower shell 14 through another line 24. A cylinder 26 and piston 28 may be provided for moving the upper shell 12 so as to open and close the filter shells to seal the porous support 16 between them, or inflatable seals may be provided on one of the shells which allows the support 16 to be sealed to the shells without requiring movement of the shells. A suitable flat bed filter is described in U.S. Patent No. 2,867,326, issued to Gen Hirs, and reference may be made to that patent for detailed information on the filter.

The first step of the method is to precoat the porous support 16 of the filter 10 with an inert material such as coke, mill scale, sand, or any other suitable inert material. This can be accomplished by feeding the inert material from a hopper 30 into a slurry and holding tank 32 in which water is provided, and pumping the mixture of inert material and water by means of a pump 34 through line 22 into the upper shell of the filter 10. After the water has passed through the filter, it returns via lines 24 and 36 to the slurry and holding tank 32 and more inert material from hopper 30 is mixed with it in the tank. For this purpose, valve 38 is open and valve 40 is closed. The slurry is fed continuously to the filter until a cake or bed has been formed on the support 16 upon which filtration can be started.

The liquid to be filtered is then introduced into the tank 32 through line 42, and inert material from hopper 30 is fed into the tank 32 to provide a body feed. The liquid entering tank 32 from line 42 may be water containing cellulose pulp fibers. The ratio by weight of body feed to pulp may be from 100 to 1, to 1000 to 1 by weight. This would mean that if 1000 gallons of liquid contained 10 pounds of pulp, 1000 pounds of inert material could keep the filter cake porous and nonplugging.

Upon initiation of filtration, valve 38 is closed and valve 40 is opened to direct the effluent liquid through lines 24 and 44 into a tank 46. The mixture of water, pulp and body feed is pumped by pump 34 into the upper shell 12 of the filter. The cake on the porous support 16 takes out the pulp and the inert material and allows the liquid to pass through to the lower shell 14 from which the liquid leaves via lines 24 and 44 to the holding tank 46. This process can continue until the filter medium eventually becomes unduly clogged, and this can be detected by sensing the pressure in the filter or by any other means that could reflect the total amount of body feed that has been fed to the filter.

When the end of a filtration cycle has been reached, the pump 34 is shut off and the filter 10 is drained as by blowing it down so as to remove liquid from the upper shell 12. The seal between the shells 12 and 14 and the porous support 16 is broken, either by opening the shells or by opening an inflatable seal for the shells. This releases the support 16 so that the portion between the shells can be advanced out of the filter and a fresh portion will simultaneously be advanced into the filter. As the support 16 passes around roll 18, the cake is dumped onto another conveyor 50 which runs through an incinerator 52. Thus, the cake containing a mixture of inert and cellulose pulp fiber is transferred to the incinerator 52.

The incinerator 52 may be of the oven type, and the temperature therein is maintained at a level above the temperature required to oxidize the cellulose pulp fibers contained in the filter cake, and below a temperature at which the inert material would be oxidized or otherwise altered. Therefore, the cellulose pulp fibers will burn and go up the stack 54 as smoke, but the inert material remains intact and can be used again to provide a filter media. To this end, the inert material is dumped from the conveyor 50 into the hopper 30 as the conveyor belt passes around an end roll 56. The inert material can then be again fed by the hopper to liquid in tank 32 for precoating purposes and/or to provide body feed for the liquid to be filtered, and in this manner there is a complete regeneration cycle and reuse of the inert material. Also, there is a complete disposal of the paper pulp since the pulp is all consumed in the incinerator 52.

Thus, it may be seen from the foregoing description that the invention provides an efficient and effective process and apparatus for removing organic materials from a liquid. The process may be applied to the removal of any organic material that can be oxidized at a temperature lower than that which would oxidize or alter the inert material which is used as the filter media in the process. As previously mentioned, the process could be applied to the disposal of sewage which is primarily composed of organic materials, and would involve a fast oxidation of the organic materials. Due to the use of body feed in the process, new surfaces are continually being developed in the filter medium, and the effect is as if the filter medium had an infinite area. Thus, filtration can continue for relatively long periods of time before regeneration is started.

I claim:

1. A filtration method for filtering an organic material from a liquid comprising the steps of forming a cake of inert material on a porous support in a filter to precoat the support and thus form a filter medium, feeding liquid containing additional quantities of said inert material and said organic material in a ratio of at least 100 parts of inert material to one part of organic material by weight through said cake and said support to separate out the inert material and organic material from the liquid with the inert material building up the filter medium and keeping the same porous, terminating the feeding of said liquid containing inert material and organic material when said cake and said support become clogged to a predetermined degree, advancing said support with said cake thereon out from said filter, transferring said filter medium to an incinerator, selectively burning the organic material in said cake in said incinerator with conditions whereby said inert material remains intact, and recyling the inert material from said incinerator back through said precoating and feeding steps to reuse said inert material in said method.

2. A filtration method including the steps of precoating a porous support of a filter with inert material acting as a filter aid and forming a cake on said support providing a filter medium, feeding to said filter a slurry containing paper pulp and a quantity of said inert material in a ratio of at least 100 parts of inert material to each part of pulp by weight with said filter medium taking out the pulp and inert material and said inert material building up the filter medium and keeping said filter medium porous, drawing off the effluent from said filter, terminating the feeding of said slurry, advancing said filter medium from said filter and simultaneously advancing fresh porous support into said filter, transferring said cake from said filter medium into an incinerator and burning therein with conditions to selectively consume the organic material such as paper pulp in said cake without substantial ash and leave the inert material intact, and transferring the inert material from said incinerator to a feeding means for feeding inert material into said slurry to thereby continuously recycle the inert material.

3. A filtration method including the steps of adding inert filter aid material selected from the group consisting of coke, mill scale and sand to a liquid, passing said liquid through a porous support of a filter to precoat said support with a cake of said inert material, adding further inert material selected from said group to a mixture of organic material and liquid to form a slurry in which the ratio of inert material to organic material is at least 100:1 by weight, feeding said slurry to said filter, passing said slurry through said cake and said support to separate said organic material and said inert material from the liquid while building up said cake with inert material to keep said cake porous, drawing said liquid off from said filter, terminating the feeding of slurry to said filter, advancing said support with said cake thereon from said filter and advancing fresh porous support into said filter, transferring said cake into an incinerator and burning with conditions to selectively consume the organic material therein while leaving the inert material intact, and transferring the latter inert material to a feeding device for adding the same to liquid so as to recycle the inert material and thereby reuse the same in said method.

References Cited

UNITED STATES PATENTS

| | | | |
|---|---|---|---|
| 1,876,123 | 9/1932 | Wright | 210—152 |
| 1,892,681 | 1/1933 | Rankin | 210—152 X |
| 2,423,172 | 7/1947 | Booth | 210—75 X |
| 2,738,880 | 3/1956 | Whitney | 210—193 |
| 2,822,091 | 2/1958 | Martine | 210—75 |

SAMIH N. ZAHARNA, Primary Examiner

U.S. Cl. X.R.

210—75, 152